United States Patent
Grimmer

[15] 3,659,033

[45] Apr. 25, 1972

[54] ELECTRICAL BUSHING HAVING ADJACENT CAPACITOR SECTIONS SEPARATED BY AXIALLY CONTINUOUS CONDUCTIVE LAYERS, AND INCLUDING A COOLING DUCT

[72] Inventor: Elmer J. Grimmer, Sharpsville, Pa.

[73] Assignee: Westinghouse Electric Corporation, Pittsburgh, Pa.

[22] Filed: Oct. 28, 1970

[21] Appl. No.: 84,774

[52] U.S. Cl. ................. 174/15 BH, 174/31 R, 174/143
[51] Int. Cl. ................................................. H01b 17/28
[58] Field of Search ............. 174/15 BH, 16 BH, 31 R, 73 R, 174/142, 143; 317/242, 243, 260; 323/93

[56] References Cited

UNITED STATES PATENTS

| 1,129,467 | 2/1915 | Fortescue | 174/143 |
| 2,288,969 | 7/1942 | Kirkwood | 174/143 |
| 3,331,910 | 7/1967 | Grimmer et al. | 174/15 BH |
| 3,462,545 | 8/1969 | Grimmer | 174/143 |
| 3,584,131 | 6/1971 | Allmendinger | 174/31 R |

FOREIGN PATENTS OR APPLICATIONS

| 1,122,364 | 5/1956 | France | 174/143 |
| 289,850 | 8/1928 | Great Britain | 174/143 |

*Primary Examiner*—Laramie E. Askin
*Attorney*—A. T. Stratton, F. E. Browder and Donald R. Lackey

[57] ABSTRACT

A condenser bushing including a conductor, electrical insulation disposed about the conductor, and a plurality of radially spaced cylindrical layers of electrically conductive material disposed in the electrical insulation. The cylindrical layers of electrically conductive material are arranged to provide at least first and second concentric radially adjacent condenser systems, with at least one of the systems being of the split or axially divided type. The first and second condenser systems are separated by a continuous electrically conductive layer, not structurally related to either adjacent system, but which functions as the outermost layer of the first condenser system, and the innermost layer of the second condenser system, to connect the two systems in series.

3 Claims, 4 Drawing Figures

PATENTED APR 25 1972 3,659,033
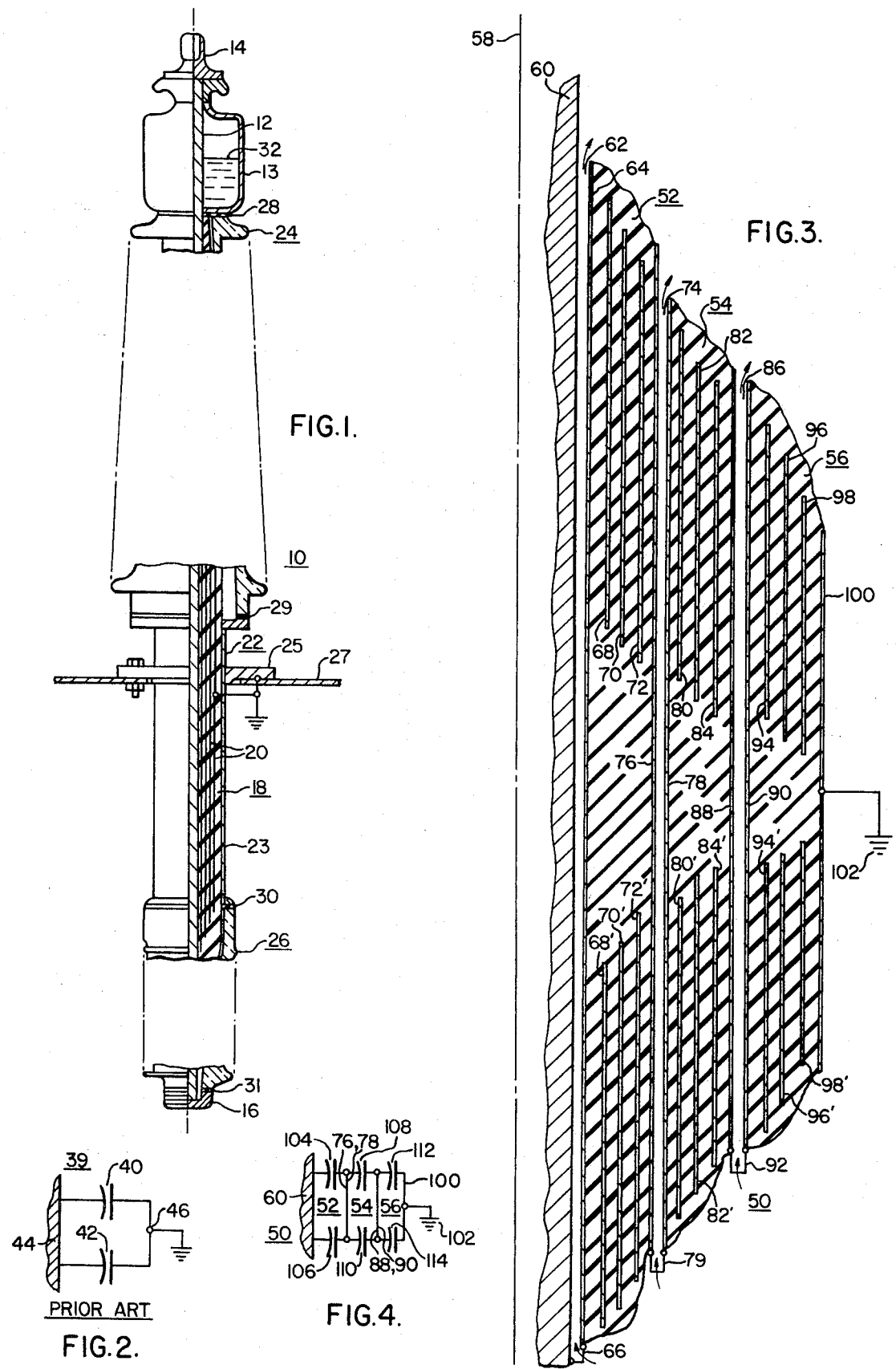

ELECTRICAL BUSHING HAVING ADJACENT CAPACITOR SECTIONS SEPARATED BY AXIALLY CONTINUOUS CONDUCTIVE LAYERS, AND INCLUDING A COOLING DUCT

BACKGROUND OF THE INVENTION

1. Field of the Invention

The invention relates in general to electrical bushings, and more specifically to condenser bushings of the type suitable for use with power transformers and power circuit breakers.

2. Description of the Prior Art

Condenser type bushings of the prior art, such as those used with power transformers and power circuit breakers, have a plurality of radially spaced cylindrical layers of electrically conductive material disposed in electrical insulation about the bushing conductor, to grade radial and longitudinal voltage distribution throughout the insulating material of the bushing.

Designs for the condenser section of EHV (extra high voltage) bushings, when using the teachings of the prior art, are often impractical or extremely large in diameter. This is due to the large external and internal clearances required between the top and bottom terminal ends of the bushing and an intermediate metallic flange assembly which is used to mount the bushing to a grounded metallic casing of associated electrical apparatus. The length of the grounded metallic flange assembly is kept as short as possible, so that it does not add unnecessarily to the overall length of the bushing, as bushing length is already a problem in EHV bushings from the standpoint of mounting the bushings and supporting them. Further, the length of the outermost conductive layer of the condenser section, which is grounded during normal operation of the bushing, is short compared with the length of the innermost conductive layer. This high ratio of the innermost to the outermost conductive layer length results in capacitor systems which do not make the most economical use of the bushing insulation, and which do not provide the required control of voltage gradients in the bushing.

Increasing the length of the outermost or ground layer of the capacitor section, or shortening the extension of the capacitor section into the upper porcelain housing, to provide a more favorable ratio of the length of the inner layer to the length of the outer layer, is not a solution to the problem as the distribution of the voltage across the length of the external porcelain is adversely affected, increasing the probability of flashover.

The use of split or axially divided capacitor layers between the bushing conductor and the ground layer, such as disclosed in U.S. Pat. Nos. 3,394,455 and 2,462,545, both of which are assigned to the same assignee as the present application, has been beneficial in EHV bushings, as it reduces the required radial build of the condenser section. However, the problems hereinbefore set forth are encountered, even with the split capacitor arrangement, at the upper end of the present EHV voltage range.

SUMMARY OF THE INVENTION

Briefly, the present invention is a new and improved condenser bushing which more uniformly stresses the insulation of the capacitor section and provides the desired control of voltage gradients within the bushing, without increasing the length of the ground layer, and without reducing the extension of the capacitor section into the upper porcelain housing. This is accomplished by utilizing a plurality of separate concentric, radially adjacent condenser systems, with at least one of the systems being of the axially divided or discontinuous type. At least one continuous, electrically conductive layer is disposed between adjacent condenser systems, with the continuous layer being independent from the specific structural capacitor arrangements of the adjacent systems, thus enabling it to function as the outermost layer of the adjacent inner capacitor system, and the innermost layer of the adjacent outer split capacitor system. This provides a structure in which the capacitor system has two capacitors effectively connected in parallel, and the parallel connected capacitors are serially connected with the capacitor, or capacitors of the other radial systems, between the bushing conductor and the ground layer of the capacitor system. The radially disposed capacitor systems are constructed to each control a desired percentage of the total voltage stress, enabling much closer control over the voltage gradients within the bushing, and thus more effectively utilizing the electrical insulation of the bushing.

The disclosed construction also facilitates disposing cooling ducts through the condenser section, as the cooling ducts may be disposed immediately adjacent the continuous electrically conductive layer which separates the different capacitor systems, and another continuous layer of electrically conductive material may be disposed on the other side of the duct. Interconnection of the two continuous layers reduces the magnitude of electrical stress in the duct, preventing breakdown of the cooling oil which flows therethrough.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which:

FIG. 1 is an elevational view, partially in section, of a condenser bushing of the type which may utilize the teachings of the invention;

FIG. 2 is a schematic representation of a prior art condenser bushing arrangement;

FIG. 3 is a partial diagrammatic representation of a condenser section constructed according to the teachings of the invention, which may be used with the condenser bushing shown in FIG. 1; and FIG. 4 is a schematic representation of the condenser section shown in FIG. 3.

DESCRIPTION OF PREFERRED EMBODIMENTS

Referring now to the drawings, and FIG. 1 in particular, there is shown an elevational view of a condenser bushing 10 of a type which may utilize the teachings of the invention. Bushing 10, which may be used with power transformers or power circuit breakers, has a generally elongated shape, and includes a centrally or axially disposed electrical conductor 12, which is constructed of a good electrical conductor, such as copper or aluminum. Conductor 12 is terminated at its upper end by an expansion bowl 13 and a suitable terminal cap assembly 14, which is adapted for connection to an external electrical conductor, and at its bottom end by terminal means 16, which is adapted for connection to a conductor of the associated electrical apparatus. The electrical conductor 12 has an insulating or condenser section 18 disposed thereon, which may be formed of layers of insulating material having a plurality of spaced metallic foil sheets 20 disposed therein to form cylindrical capacitor plates to grade the radial and longitudinal voltage distribution in the bushing. The insulating or condenser section 18 may be formed by winding a high quality paper on the electrical conductor 12 while the paper is under a predetermined uniform tension, and feeding in metallic foil sheets or capacitor plates at predetermined intervals to provide a plurality of serially connected capacitors. Since it is desirable to uniformly grade the radial voltage across condenser section 18, the capacitance of each section may be constructed to be equal. For example, as the diameter of the capacitor plates 20 increases, the longitudinal length of the plates may decrease in order to maintain substantially the same surface area. The graduated length of the foil layers 20 provides graded voltage longitudinally or axially along the length of the bushing.

The condenser section 18 is oil impregnated to fill all of the voids in the structure and prevent the formation of corona discharges therein, to provide a minimum power factor and thus reduce dielectric heating of the structure, and in certain ratings it includes one or more ducts for circulation of the oil to remove heat from the condenser section.

A grounded metallic flange assembly 22 is disposed intermediate the ends of the bushing 10 and adjacent to the condenser section 18, which includes a metallic cylindrical flange tube member 23 and connected flange member 25, providing means for attaching the bushing 10 to a metallic transformer or circuit breaker casing 27. Shell-like insulating members 24 and 26, which may be constructed of an electrical grade of porcelain having a glazed, corrugated outer surface for providing additional creep distance, or of a suitable resin system, such as an epoxy resin, are disposed between the flange assembly 22 and the upper terminal 14, and between the flange assembly 22 and the bottom terminal 16, respectively. The ends of the shell members 24 and 26 are machined flat and parallel to provide surfaces for sealing gaskets, such as gaskets 28, 29, 30 and 31, for hermetically sealing the bushing 10. Shell members 24 and 26 provide weatherproof insulating means between the ends of the bushing and central grounded flange assembly 22, and also provide a container for the insulating and cooling fluid 32, such as mineral oil, with which the bushing 10 is filled.

While bushing 10 has been described as having a capacitor section formed of layers of paper interspersed with radially spaced layers of electrically conductive material to provide capacitor plates, it is to be understood that the condenser section 18 may be constructed in any other suitable manner, such as by winding the capacitor section with resin impregnated paper, such as epoxy resin, adding sheets of foil as required, or by placing the capacitor plates in a mold and introducing a liquid resinous insulation system thereto, such as an epoxy or polyester resin, which resin system is subsequently cured to a solid. In the latter instance, the entire insulating structure of the bushing, including the weather sheds, may be formed of cast resin. Further, while the capacitor plates are broadly termed electrically conductive, it is to be understood that they may be formed of sheets, foils, or coatings, of a good electrical conductor, such as copper or aluminum, they may be sheets or coatings of partially conductive material, such as those containing carbon, or they may be sheets or coatings of semiconductive material, i.e., material having a distinct voltage dependent resistivity, such as those containing silicon carbide.

The extra high voltages (EHV) i.e., above 230 KV, now being generated by electrical utilities, require that the apparatus associated therewith, such as power transformers and power circuit breakers, have unusually long electrical bushings. This is due to the dimensions of the clearances required between the terminals 14 and 16 and the grounded flange assembly 22. Thus, the length of the flange tube 23 must be kept as short as possible so it does not add unnecessarily to the bushing length. However, keeping the flange 23 as short as possible restricts the length of the outermost conductive layer of the condenser section, which is the ground layer of the section. The length of the innermost conductive layer is dictated by the length of the bushing conductor, and hence is very long. This high ratio of the length of the innermost to the outermost conductive layers results in poor utilization of the bushing insulation, highly stressing some areas of the insulation while other areas are subject to very little stress, as the control of voltage gradients within the bushing is less than optimum. Reducing the extension of the condenser section 18 into the upper portion of housing 24, or increasing the length of the outermost conductive layer of the capacitor section 18, in order to obtain a more favorable ratio, adversely affects the distribution of the voltage across the external surfaces of the porcelain housings, increasing the chances of flashover.

The split or axially divided condenser section, such as shown in the hereinbefore mentioned United States patents, has been an excellent arrangement for extra high voltage bushings, resulting in two capacitors effectively connected in parallel between the bushing conductor and grounded flange assembly. FIG. 2 schematically illustrates a prior art bushing assembly 39 having a split condenser section represented by capacitors 40 and 42 connected in parallel between the bushing conductor 44 and the grounded flange assembly, which is given the reference numeral 46.

While the prior art bushing arrangement shown in FIG. 2 has been successfully employed in EHV bushings, when the bushings are designed for the upper range of EHV voltages, even the split condenser arrangement results in less than optimum utilization of the bushing insulation.

FIG. 3 is a diagrammatic representation of a condenser section 50, which may be used in bushing 10 shown in FIG. 1, or any other suitable bushing construction, with the condenser section 50 being constructed according to the teachings of the invention. Condenser section 50 obtains a more efficient usage of the bushing insulation, and a more linear voltage distribution across the porcelain housings 24 and 26, without increasing the length and diameter of the bushing.

More specifically, it has been found that by using two or more superposed condenser sections, at least one of which is of the split or axially divided type, with adjacent sections separated by an axially continuous layer of conductive material, that excellent control is provided over voltage gradients in the bushing, resulting in more uniformly stressing the bushing insulation, and more linearly distributing voltages across the porcelain housings, without increasing the length of the outermost or grounded layer of the condenser section, or reducing the length of the innermost layer. The plurality of individual condenser sections may be formed progressively on the bushing conductor, or they may be constructed separately and telescoped into the desired positions. Each axial half of any split type condenser section may be formed individually, if desired, and telescoped into position, with each cylindrical layer in each half being aligned with a cylindrical layer in the other half, or offset, as desired.

FIG. 3 diagrammatically illustrates a condenser section 50 having first, second and third radially superposed condenser systems 52, 54 and 56, respectively, all of the axially divided type but it is to be understood the invention applies to two or more condenser systems, at least one of which is of the divided type, with the total number of condenser sections used being determined by the BIL voltage rating of the bushing. Radially adjacent condenser systems are separated by a continuous layer of conductive material, which serially interconnects the capacitors of the adjacent condenser systems. The axially continuous separating layers are not structurally part of either adjacent system, but may be formed of the same material of which the plates of the adjacent condenser systems are formed.

The radially adjacent condenser systems are illustrated in FIG. 3 as being separated by two spaced continuous layers, because the new and improved condenser system 50 facilitates the placement of substantially vertical cooling ducts, i.e., parallel with the longitudinal axis of the bushing through the condenser system, which ducts are required in certain bushing ratings, with the continuous layers being placed adjacent to the inner and outer sides of the ducts, and interconnected to provide substantially the same voltage on each side of the duct.

More specifically, condenser assembly or section 50, which is symmetrical about centerline 58, is disposed about a central or axially extending conductor 60, with an oil duct 62 provided between the conductor 60 and condenser assembly 50, if required, which is shielded by an axially continuous layer 64 which is connected to conductor 60 via connector 66.

The first condenser system 52 is designed to control a predetermined percentage of the total voltage, and for purposes of example, three axially divided layers of conductive material are illustrated, but in practice many more layers will usually be utilized. The two axially divided cylindrical capacitor foils or plates of the first layer are referenced 68 and 68', the two divided conductive layers of the second layer are referenced 70 and 70' and the axially divided conductors of the third layer are referenced 72 and 72'.

Condenser system 52, and the next radially adjacent system 54, are separated by at least one continuous layer of electrically conductive material, which functions as the outermost layer of condenser system 52 and as the innermost layer of condenser system 54. For purposes of example, a cooling duct 74 is shown disposed between the two condenser systems, with continuous layers 76 and 78 of conductive material disposed adjacent to the inner and outer surfaces of the cooling duct. The two continuous layers 76 and 78 are interconnected electrically, as shown at 79, to reduce electrical stresses across the duct, and they also function electrically as one continuous layer between the two radially adjacent condenser systems.

The second condenser system 54 is designed to control a predetermined percentage of the total voltage to ground, and it is illustrated as having first, second and third axially divided layers referenced 80 and 80', 82 and 82', and 84 and 84', respectively.

The second and third condenser systems 54 and 56 are separated by at least one continuous layer of electrically conductive material, and as illustrated, a cooling duct 86 is provided between these two condenser systems, and hence two continuous conductive layers 88 and 90 are provided, adjacent to the inner and outer sides of the duct 86 to shield the oil therein against excessive electrical stresses. The two layers 88 and 90 are interconnected electrically, as shown at 92, to provide the same voltage on each side of the duct, and the layers 88 and 90 thus function as a single layer, i.e., as the outermost layer of condenser system 54, and as the innermost layer of condenser system 56.

The third and final condenser system 56, of this example is designed to control a specific percentage of the voltage, and it includes three divided layers referenced 94 and 94', 96 and 96' and 98 and 98', respectively, and an outer continuous layer 100, which functions as the ground layer. Grounded layer 100 is connected to the metallic flange assembly, which in turn is connected to the grounded metallic casing of the associated electrical apparatus, referenced 102.

The new and improved bushing condenser assembly 50 is illustrated schematically in FIG. 4, with the first condenser system 52 being illustrated by capacitors 104 and 106 connected in parallel between the bushing conductor 60 and the continuous layers 76 and 78. The second condenser system 54 is illustrated schematically by capacitors 108 and 110 connected in parallel between continuous layers 76, 78 and continuous layers 88, 90 and thus the parallel connected capacitors 108 and 110 are serially connected with the parallel connected capacitors 104 and 106.

The third condenser system 56 is illustrated schematically by capacitors 112 and 114, connected in parallel between continuous layers 88, 90, and the ground layer 100, and thus the parallel connected capacitors 112 and 114 are serially connected with the parallel connected capacitors of the first and second condenser systems 52 and 54, respectively. This series-parallel arrangement of capacitors across the bushing insulation, between the bushing conductor 60 and the ground layer 100, provides excellent control of the voltage gradients within the bushing, more uniformly stressing the bushing insulation, and more linearly grading voltage stress both radially and axially in the bushing. Further, the new and improved bushing assembly provides these results without adding to the bushing length, or increasing the bushing diameter. An added benefit of the disclosed structure is the fact that cooling ducts may be provided through the solid insulation of the conductor assembly without upsetting the capacitive structure, and without danger of exceeding the electrical breakdown strength of the oil flowing through the ducts, as the ducts may be placed between the plurality of radially disposed condenser systems, and shielded by the continuous layers of electrically conductive material disposed between the systems, which layers function as the outer layer of the immediately adjacent inner system, and the inner layer of the immediately adjacent outer capacitor system.

While a preferred embodiment of the invention utilizes two or more radially adjacent, axially divided type condenser systems, separated by one or more continuous layers, in certain applications an axially divided condenser system may advantageously be used with a system having continuous layers, with a continuous layer disposed between the two radially adjacent systems. For example, when there is no air space above the oil in the tank of the associated apparatus the ground layer is very short. Thus, in order to increase the capacitance of the condenser system which includes the ground layer, it may utilize interleaved continuous layers, such as disclosed in copending application Ser. No. 880,228, filed Nov. 26, 1969, now U.S. Pat. No. 3,600,502, which is assigned to the same assignee as the present application, with the next adjacent system being of the split type, and the two systems separated by continuous layers which are not part of the basic structural arrangement of either adjacent condenser system.

Bushings were constructed according to the teachings of the invention, and successfully tested, for a transformer to be operated at a voltage of 1,150 KV, with the bushing rating being 2,175 KV BIL, using three radially disposed split-type condenser systems, separated by axially continuous layers. These bushings were constructed such that the innermost capacitor system controlled 26.2 percent of the voltage, the intermediate capacitor system 32.4 percent, and the outer capacitor system 41.4 percent, but these values may be altered by changing the capacitance in any of the individual capacitor systems.

I claim as my invention:

1. An electrical condenser bushing, comprising an axially extending electrical conductor,
   a plurality of concentric, radially adjacent condenser systems disposed about said electrical conductor,
   at least one axially continuous layer of electrically conductive material disposed between at least two radially adjacent condenser systems, which layer is structurally independent from either adjacent system, and which functions to serially interconnect the adjacent condenser systems,
   and at least one cooling duct disposed between two adjacent condenser systems, with the at least one axially continuous layer disposed adjacent to one side of the duct, and including another axially continuous layer disposed adjacent to the other side of said duct.

2. An electrical condenser bushing, comprising:
   an axially extending electrical conductor,
   electrical insulating means disposed about said conductor,
   a plurality of radially spaced, axially discontinuous layers of electrically conductive material disposed in said insulating means, about said conductor,
   a plurality of axially continuous layers of electrically conductive material, including a continuous layer disposed about the outermost axially discontinuous layer, and at least one continuous layer disposed intermediate the axially discontinuous layers, to divide the axially discontinuous layers into a plurality of radially disposed groups,
   and at least one cooling duct disposed in the insulating means, with axially continuous layers disposed immediately adjacent to the inner and outer sides of the at least one cooling duct.

3. An electrical condenser bushing, comprising:
   an axially extending electrical conductor,
   electrical insulating means disposed about said conductor,
   a plurality of radially spaced, axially discontinuous layers of electrically conductive material disposed in said insulating means, about said conductor,
   a plurality of axially continuous layers of electrically conductive material, including a continuous layer disposed about the outermost axially discontinuous layer, and at least one continuous layer disposed intermediate the axially discontinuous layers, to divide the axially discontinuous layers into a plurality of radially disposed groups, a cooling duct disposed adjacent to the conductor, and a continuous layer disposed about said cooling duct.

* * * * *